United States Patent
Yang et al.

(10) Patent No.: US 7,853,484 B2
(45) Date of Patent: Dec. 14, 2010

(54) METHOD AND SYSTEM FOR AN AUCTION BASED ON REDUCING BID

(76) Inventors: Jeff Yang, 9F., No. 100, Synecheng Rd., Tucheng City, Taipei County 236 (TW); Wen-Hui Kuo, 3F., No. 6, Lane 94, Leye St., Da-an District, Taipei City 106 (TW)

( * ) Notice: Subject to any disclaimer, the term of this patent is extended or adjusted under 35 U.S.C. 154(b) by 252 days.

(21) Appl. No.: 11/550,889

(22) Filed: Oct. 19, 2006

(65) Prior Publication Data

US 2007/0094123 A1     Apr. 26, 2007

(30) Foreign Application Priority Data

Oct. 21, 2005     (TW) .............................. 94136901 A

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| | | | | |
|---|---|---|---|---|
| 6,366,891 B1 * | 4/2002 | Feinberg | ...................... | 705/37 |
| 6,671,674 B1 * | 12/2003 | Anderson et al. | ............. | 705/26 |
| 2004/0267624 A1 * | 12/2004 | Nuriel | .......................... | 705/26 |
| 2006/0178977 A1 * | 8/2006 | Chapelle et al. | ................ | 705/37 |
| 2007/0050281 A1 * | 3/2007 | Hoffman | ...................... | 705/37 |
| 2007/0174171 A1 * | 7/2007 | Sheffield | ...................... | 705/37 |

FOREIGN PATENT DOCUMENTS

KR          2005099005         * 10/2005

OTHER PUBLICATIONS

"Auctions: Going, Going Gone! A Survey of Auction Types." Copyright 1996, Agorics, Inc. http://www.agorics.com/Library/auctions.html.*

(Continued)

*Primary Examiner*—Jagdish N Patel
*Assistant Examiner*—Sara Chandler

(57) ABSTRACT

The present invention provides an auction method and system, that is, a seller proposes an expected selling price of an item in a tender offered by the seller and the item is announced and bid on the auction system provided by the manager of auction system, and a end time and a number of bids are set. Many buyers make bids by haggling the price down and a certain tendered bid with every bid is paid, and a bid-winner is a buyer who makes a "lowest price" and "only one" bid when the tender is concluded. The bid-winner is satisfied by buying the item at a low price, the selling price of the item offered by the seller and a commission of the auction system manager are obtained from total tendered bids of total bids and a bidding price by the bid-winner to satisfy three parties, such as the bid-winner, seller and auction system manager.

3 Claims, 5 Drawing Sheets

OTHER PUBLICATIONS

"Auctions and Auction Fever: Explanations from Competitive Arousal and Framing," by Gillian Ku. Northwestern University. 2000 issue, Kellogg Journal of Organizational Behavior. L. Thompson ed., Copyright 2001. http://www.kellogg.nwu.edu/research/ktag/kjob.htm.*

"Chapter 9 of Bargaining Games: Irrational Decisions, or Getting Carried Away," by J. Keith Murnighan. From Bargaining Games. Copyright 1992, William Murrow and Company. http://wwww.magnolia.net/~leonf/sd/bargame9.html.*

"The Dollar Auction Game: A Paradox in Noncooperative Behavior and Escalation," by Martin Shubik. Journal Conflict Resolution., 15, 1, pp. 109-111. Copyright 1971.*

* cited by examiner

METHOD AND SYSTEM FOR AN AUCTION BASED ON REDUCING BID

BACKGROUND OF THE INVENTION

1. Field of the Invention

The present invention relates to an auction method and system, and more particularly to an auction method and system is based on haggling the price down to satisfy the buyer, auction system manager and seller.

2. Description of Related Art

Auction, one of mankind's old trade ways, can be traced back to 500 B.C.'s Babylon. The modes of the auction include English auction, Dutch auction, Sealed-bid auction and Double auction . . . etc. In terms of English auction, a seller proposes a starting price for an tender of item and many buyers make different competitive bids based on the starting price, and then the supreme bid of all competitive bids is a bidding price in time that set up in advance, the buyer making the bidding price is the bid-winner to gains the item after paying the bidding price to the seller for shopping the item. Most online tenders are English auctions.

In terms of Dutch auction, a seller proposes a high starting price for an tender of item and many buyers make bids by reducing price depended on a certain price differential, the tender will be concluded until the price of one bid is accepted that is a bidding price and the bidding price is paid by the bid-winner.

Sealed-bid auction is popular on the online auction and is second only to English auction. The buyers make bids in a secret manner, each buyer can only make one bid and the buyers do not know the bid each other. When the end time is reached, the auction system manager discloses all prices of bids, and the supreme bid of all bids is a bidding price to win the tender. If the payment is in accordance with the supreme bid, the sealed-bid auction is called the first price sealed-bid auction. However, if the payment is in accordance with the second high bid, the sealed-bid auction is called the second price sealed-bid auction that is named Vickrey auction too. In terms of Double auction, the buyers and the seller can propose the expected prices individually, and the tender is concluded when the expected price of the buyer is same with the one of the seller.

Regardless on the online shopping or the materialized shopping, the psychology of human nature is never changed on haggling the price down and negotiating the price from ancient times to the present, that is, the seller hope that the higher the selling price is, the better the selling price is and the buyer hope that the lower the purchasing price is, the better the purchasing price is. The price negotiation is never suspended from the small commerce on the traditional food market to the business of more than one hundred million on the international trade. It is difficult to find the balance based on the thought between the seller expects the high selling price and the buyer expects the low purchasing price. English auction system is the conventional auction generally used nowadays; many buyers make bids after the seller proposes a starting price, the bid method is increasing the price based on the start price, and the bid-winner is the only one buyer that makes the supreme bid. The money flow is that the item is shipped to the bid-winner after the seller receives the bidding price from the bid-winner and the seller pays a commission to the auction system manager, such as YAHOO auction, eBay auction, FORBES auction . . . etc. as is known to all.

However, above-mentioned conventional auction systems have the following shortcomings:

1. The seller has to propose a starting price for a tender, and the starting price is not the expected price of the seller since the seller will consider if the starting price is too high.

2. The seller receives a bidding price after concluding the tender and has to pay a part of bidding price as a commission to the auction system manager, and the commission will be shifted to the buyer.

3. The income of auction only satisfies the seller or only benefits the seller, and the buyer has to pay the high price possible for satisfying the seller. Moreover, the buyer must pay the high price on the tender of an item even if the result is beyond the seller's expectations. Therefore, the conventional auction has the drawback on unilateral benefit only.

4. The buyer has to pay higher and higher price and can not make a deal with a price lower than the starting price. Furthermore, the buyer makes a deal with a price higher than the market price.

In the conventional auction system, many buyers make bids after the seller proposes a starting price, the bid method is increasing the price based on the start price, and the bid-winner is the only one buyer that makes the supreme bid. The money flow is that the item is shipped to the bid-winner after the seller receives the bidding price from the bid-winner and the seller pays the commission to the auction system manager.

SUMMARY OF THE INVENTION

The main objective of the present invention is to provide an auction system based on haggling the price down, and an tender is finished in the auction system through a method, the method comprising the steps of:

(a) setting a plurality of bidding parameters for a tender of item such as a starting price, a tendered bid of each time, a limited number of bids, and an end time . . . etc. in the auction system;

(b) providing to select an item depended on the demand of a buyer, so that the buyer inputs a bid command and is deducted the certain tendered bid by the auction system with every bid;

(c) checking if the buyer possesses enough value points and noticing the buyer to replenish the value points as the buyer does not have the enough value points;

(d) inputting a price of making bid after the auction system confirms the buyer has the enough value points;

(e) recording the value points that should be deducted with every bid after the buyer makes bid;

(f) judging if the tender is concluded through evaluating all parameters on concluding the tender by the auction system, so that the tender is sustained if "No", and the tender is concluded and the platform of the auction system is closed if "Yes"; and (g) judging if the buyer's bid is accepted, so that the tender is concluded if "No" and the tender is in a condition of failed auction, the tendered bid paid by the buyer is returned totally, and a bid-winner is decided by the auction system depended on the bidding rule of a only lowest price if "Yes" and the procedure of the tender of term is terminated by the auction system after the bid-winner is noticed to win the tender.

Compared with the conventional techniques, the present invention has the benefits that the present invention provides an auction system based on haggling down the price that is different from the conventional technique so as to win a bid based on the only supreme bid, and the present invention is based on the only lowest bid.

Further benefits and advantages of the present invention will become apparent after a careful reading of the detailed description with appropriate reference to the accompanying drawings.

DETAILED DESCRIPTION OF THE INVENTION

Figure 1:
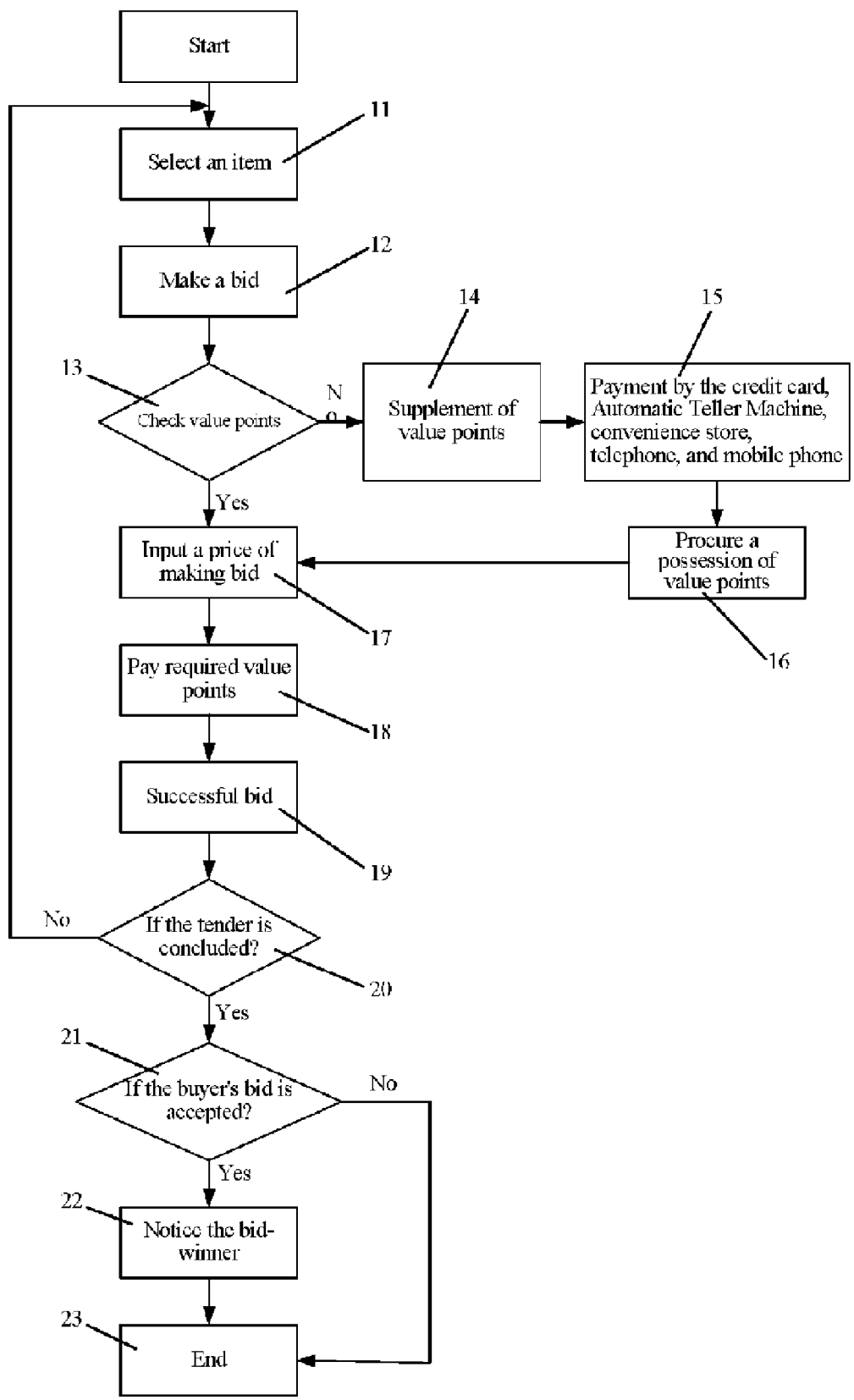
FIG. 1 shows a flow chart to make a bid for a tender according the present invention.

FIG. 1 shows a flow chart to make a bid for a tender according the present invention. The present invention provides an auction system based on haggling the price down, and the seller is satisfied by obtaining an expected selling price and the buyer is satisfied by getting a good buying price in the auction system. The method is that the sellers or the auction system manager offer an item for a tender and set a starting price, and many buyers make bids and the prices of bids are below the starting price. The buyer has to pay a certain tendered bid with every bid, the tendered bid is set by the auction system manager, and the auction system manager also sets a limited number of bids and an end time.

When the total number of bids and the end time reaches after the buyers make bids, the tender is concluded and a bid-winner is an only one buyer making the lowest bid. The tender is failed if the only one buyer is not found, the tendered bid paid by the buyer is returned totally.

If the only one buyer wins the tender, the money flow is that the auction system manager obtains the total tendered bids from total buyers and a bidding price from the bid-winner, and the seller get an expected price from the auction system manager. At this moment, the auction system manager could determine if the seller pays the commission, and the tender is finished after the auction system manager confirms the identity of bid-winner and ships the item.

Step 1: System Setting

Firstly, the sellers or the auction system manager offer an item for a tender, and then the auction system computes the selling price to the seller and the commission to the auction system manager after selling the item out so as to set a starting price, a tendered bid of each time, a limited number of bids, or an end time.

Step 2: Start

A buyer selects an item (11) depended on the demand of a buyer, and then the buyer could make a bid (12).

Step 3: Bid Offer

The auction system could provide that the buyer inputs a bid command and is deducted the certain tendered bid with every bid;

Step 4: Check of Value Points

The auction system would check if the buyer possesses enough value points (13) after the buyer inputs a bid command, the auction system would notice that the buyer is necessary to make a supplement of value points (14) if "No", and the supplement of value points (14) can be made by using the credit card, Automatic Teller Machine, convenience store, telephone, and mobile phone (15) for payment to procure a possession of value points (16), and the exchange of value points is set by the auction system manager (in general, a value points is NT$ 1).

Step 5: A Price Input of Making Bid

The auction system would display for inputting a price of making bid (17) by the buyer if the result of the check of value points is "Yes".

Step 6: Record of the Value Points that Should be Deducted

The auction system records the value points of tendered bid (18) that should be deducted with every price of making bid (17) after the buyer makes bid, and it is a successful bid (19).

Step 7: Judgment if the Tender is Concluded

The auction system would make a judgment if the tender is concluded (20) through integrating and evaluating all parameters on concluding the tender, such as the number of bids, the end time . . . etc., and the tender is sustained if "No", and the tender is concluded and the platform of the auction system is closed if "Yes".

Step 8: Judgment if the Buyer's Bid is Accepted

The auction system would make a judgment if the buyer's bid is accepted (21), so that the tender is concluded (23) if "No" and the tender is in a condition of failed auction, the tendered bid paid by the buyer is returned totally, and a bid-winner is decided by the auction system depended on the bidding rule of a only lowest price if "Yes" and the procedure of the tender of term is terminated (23) by the auction system after the bid-winner is noticed to win the tender (22).

Figure 2:
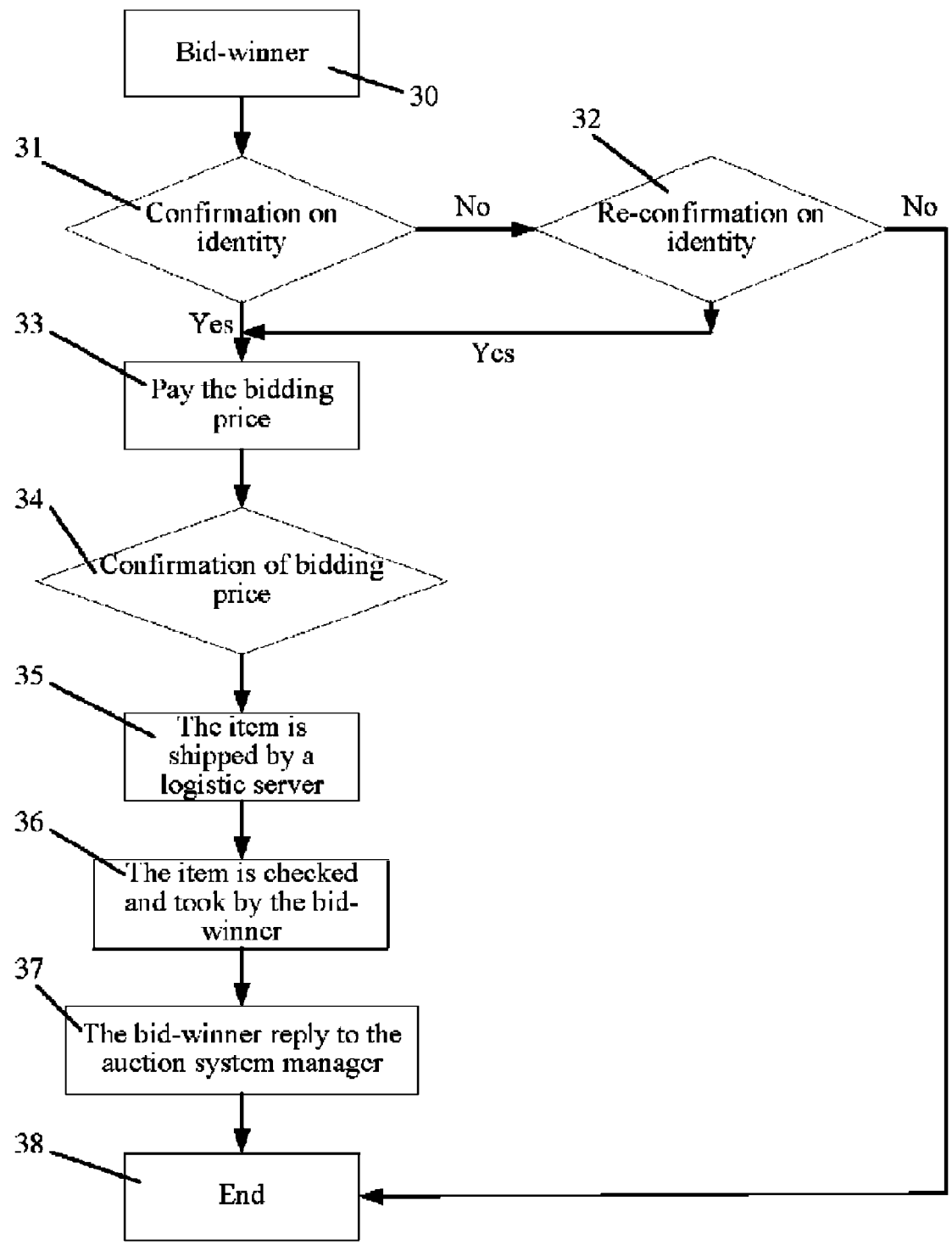
FIG. 2 shows a flow chart of shipment according the present invention.

Referring to FIG. 2, it shows a flow chart of shipment according the present invention. The auction system manager makes a confirmation on identity (31) of bid-winner (30) after the tender is concluded. A re-confirmation of identity (32) is executed if the result of the confirmation of identity (31) is "No" and it is end when the result of the re-confirmation of identity (32) is "No", and the second "lowest price" and "only one" bidder in turn will be the bid-winner or the tender is refreshed. If the result of confirmation on identity (31) or re-confirmation of identity (32) is "Yes", the auction system manager pays the bidding price (33) set in advance to the sellers and the item is sent through a logistic server (35) after a confirmation of bidding price (34) is finished. The item is checked and took by the bid-winner (36), and then the bid-winner reply to the auction system manager (37) for the end (38) of the procedure.

The interpretation on comparing between the conventional auction system and the prevent invention is as follows.

Figure 3:
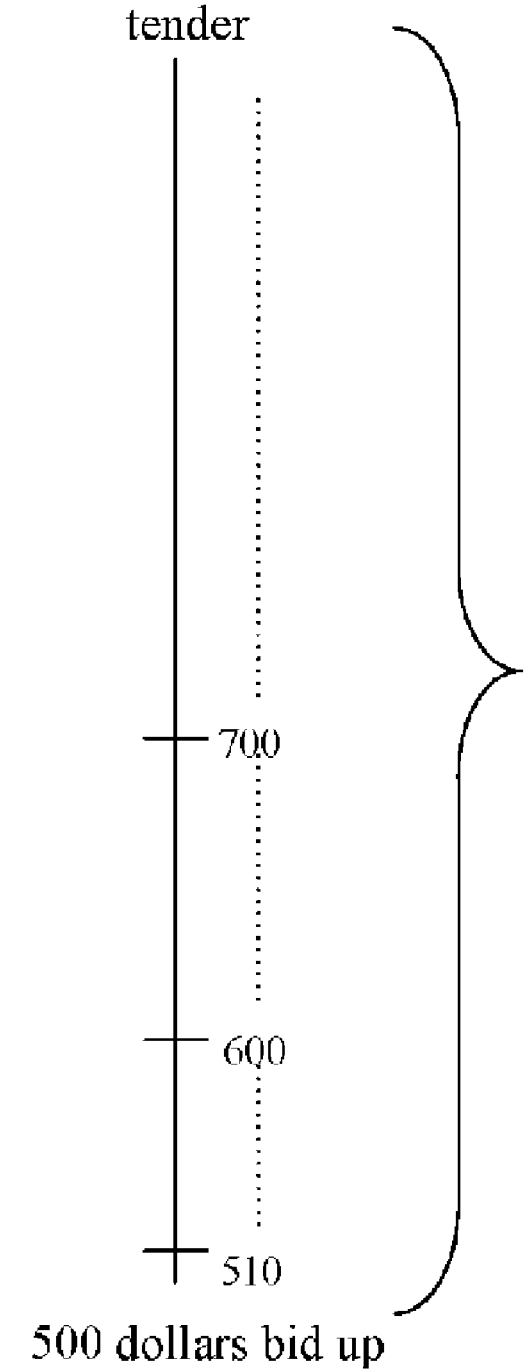
FIG. 3 shows a method to make a bid for a tender according the conventional technique.

In a conventional auction system, a seller offers an item and proposes a starting price, and sets an end time for a tender. Referring to FIG. 3., the seller sets 500 dollars as the starting price, the buyers make bids to increase 10 dollars with every bid and the prices of every bid raised to 510, 520 . . . etc., and the tender is concluded as the end time reaches. At this moment, a bidding price is 1000 dollars and the only one buyer making the bidding price is a bid-winner, and the bid-winner pays 1000 dollars to the seller for buying the item and the seller pays a commission to the suction system manager.

Figure 4:
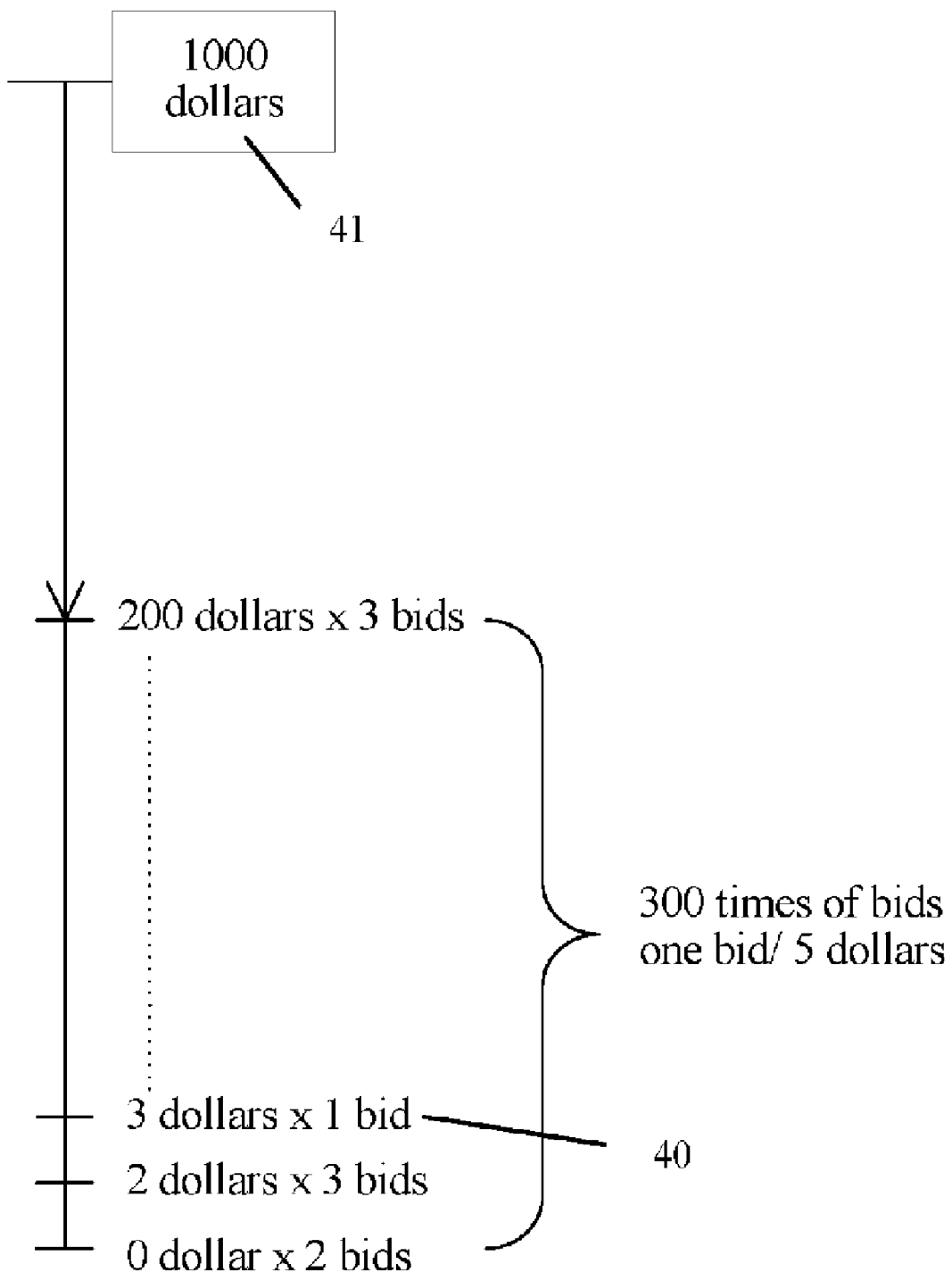
FIG. 4 shows a method to make a bid for a tender according an embodiment of the present invention.

However, referring to FIG. 4, it shows a method to make a bid for a tender according an embodiment of the present invention. A seller offers an item and an expected selling price (41) is 1000 dollars, and an auction system manager sets 300 times of bids and 200 dollars bid down (also can be set 1000 dollars bid down), the range of bid is an arbitrary price between 200 and 0 dollar and the bid is nondisclosed not to be knew the bid the other buyer. The buyer pays 5 dollars to the auction system manager as a tendered bid, the auction system manager receives 1500 dollars on total tendered bids and an only one lowest price (40) that is 3 dollars on bidding price. Therefore, the auction system manager receives 1503 dollars totally, and the income of auction system manager is 503 dollars after paying 1000 dollars to the seller and sending the item to the bid-winner.

Accordingly, if the bid-winner makes one bid only, the bid-winner pays 8 dollars for buying the 1000 dollars worth of item, that is, 5 dollars on tendered bid and 3 dollars on bidding price, and the seller obtains 1000 dollars of the expected selling price and the income of auction system manager is 503 dollars to satisfy the three parties, that is buyer, seller, and auction system manager.

The present invention provides a lowest bidding price to win a bid and the number of persons on "only one" is depended on the amount of items, that is, the bid-winner on the "lowest price" and "only one" bid is one person if there is only one item and the bid-winners on the "lowest price" and "only one" are three persons if there are three items. Besides, the tendered bid paid by the buyer is returned totally if the tender is failed and the buyer on the second "lowest price" and "only one" bid will be the bid-winner if the item is sent back due to the unsatisfactory of the bid-winner.

The buyer will be noticed by a feedback information if the bid is accepted when the auction system manager receives the bid, and the feedback information shows the forward digits of the bid and the stars as the backward digits of the bid so as to notice the buyer that the bid is accepted and to keep secret on the bid. The total relative data of the tender can be inquired after the procedure to conclude the tender is finished.

In addition to, the present invent based on the price lower than the expected selling price or higher than the starting price can decide the bid-winner by adopting the only one of higher bid or lower bid.

Moreover, the method on making bid according the present invention can use the type of online, telephone, fax . . . etc.

Figure 5:
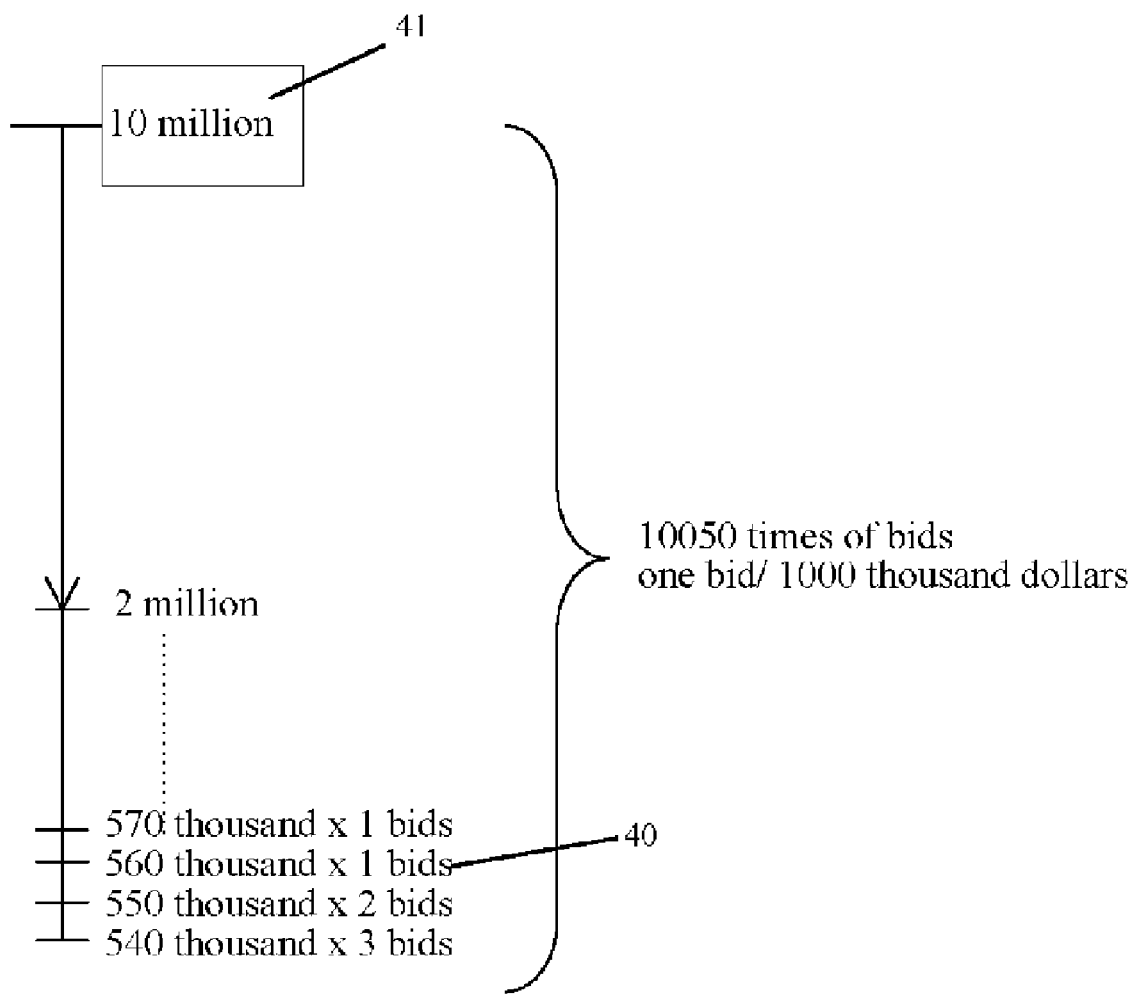
FIG. 5 shows a flow chart to make a bid for a tender according another embodiment of the present invention.

Referring to FIG. 5, it shows a flow chart to make a bid for a tender according another embodiment of the present invention. Nowadays, a seller provides a building as an item and set 10 million dollars as an expected selling price, and the auction system manager sets 2 million dollars as a starting price, offers 100500 times of bids by receiving 1000 dollars as a tendered bid with every bid for 2 million dollars bid down. The auction system manager does not disclose the price of bids and the buyers pay 1000 dollars as the tendered bid to the auction system manager, the total income on the tender is 10.61 million dollars which summarize the 10.05 million dollars on total tendered bids and 560 thousand dollars on a "lowest price" and "only one" bid after finishing the 10050 times of bids. Therefore, the pure benefit of the auction system manager is 610 thousand dollars after the auction system manager pays 10 million dollars to the seller for the expected selling price and send the item to the bid-winner so that the bid-winner buy the 10 million worth of building by paying 561 thousand dollars, the seller obtain the expected 10 million dollar on selling the item, and the auction system manager gain the 610 thousand as a commission to satisfy three parties, such as the bid-winner, seller and auction system manager.

The present invention has the benefits, as below:

1. The present is an innovative auction system based on haggling down the price to finish the auction by satisfying three parties, such as the bid-winner, seller and auction system manager, there are many major differences with English auction so that the present invention is novel.

2. A space is provided in the auction system to haggle the price down by the particular improvements and designs according the present invention, so that the seller obtain the expected selling the item, and the bid-winner pays a good bidding price for buying the item to reach the win-win efficacy.

Although the present invention has been explained in relation to its preferred embodiments, it is to be understood that many other possible modifications and variations can be made without departing from the spirit and scope of the invention as hereinafter claimed.

What is claimed is:

1. A method for selling items and processing items for sale in which the sale of items is accomplished via an auction system comprising the steps of:
   (a) setting, by the auction system, a plurality of bidding parameters for an auction of an item selected from a quantity of items, each item itself being available in a quantity of one or more in the auction, said plurality of bidding parameters comprising a starting price, limit in the number of bids allowed, and an end time or time limit for the auction;
   (b) communicating by the auction system, said plurality of bidding parameters to buyers for consideration;
   (c) receiving, by the auction system, a bid command for the selected item from one of said buyers in response to the plurality of bidding parameters communicated, wherein said bid command includes an identifier of the buyer of said selected item, wherein said identifier identifies additional information about the buyer including the quantity of value points available for purchasing items associated with the buyer, and wherein value points have a monetary value depending on a set exchange rate;
   (d) retrieving, by the auction system, additional information about the buyer identified by the identifier, acknowledging the bid command for the selected item; and checking to determine whether the buyer possesses sufficient value points to purchase the selected item based on the bid command received;
   (e) when the auction system determines that the buyer does not have sufficient value points for the bid command including any commission, notifying the buyer to replenish the value points;
   (f) when the auction system determines that the buyer does have sufficient value points for the bid command including any commission, storing a bid price from the bid command; deducting value points from the quantity of value points available for purchasing items associated with the buyer and recording the deduction of value points;
   (g) determining, by the auction system, a lowest price bidder by determining and adopting a qualified lower bid price, wherein steps (c)-(f) are repeated for each bid command received from the buyers and wherein said qualified lower bid price is lower than the starting price and stored bid prices from bid commands previously received;
   (h) concluding, by the auction system, when the limit in the number of bids allowed is reached or when the end time or time limit for the auction is reached;
   (i) when the sale is concluded, determining, by the auction system, whether the sale is successful by evaluating whether the number of lowest price bidders matches the quantity of items in the auction; if so the lowest price bidders become winning bidders; if not, the value points deducted from the quantity of the value points available for purchasing items associated with each of the buyers that are not the lowest price bidders are restored;
   (j) when the sale is successful, awarding the items to the winning bidders.

2. The method as claimed in claim 1, wherein the parameters comprise whether sellers have to pay a commission.

3. The method as claimed in claim 1, wherein types of the bid commands consist of online bid commands and bid commands by telephone.

* * * * *